R. KÖLSCH.
MACHINE FOR THE MANUFACTURE OF RINGLET MESH OR NET WORK.
APPLICATION FILED JUNE 29, 1920.
1,417,257.   Patented May 23, 1922.
4 SHEETS—SHEET 1.
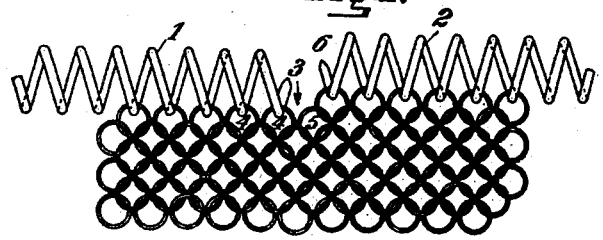
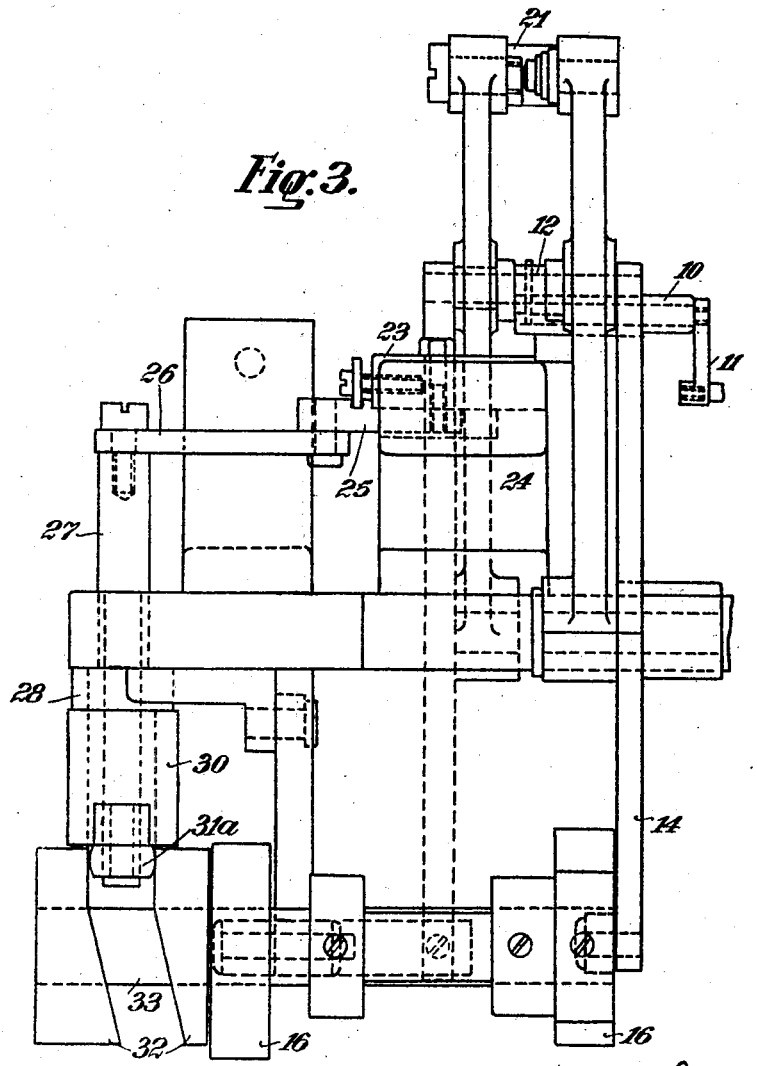
Inventor
Reinhard Kölsch
By Henry Orth Jr.
Atty.

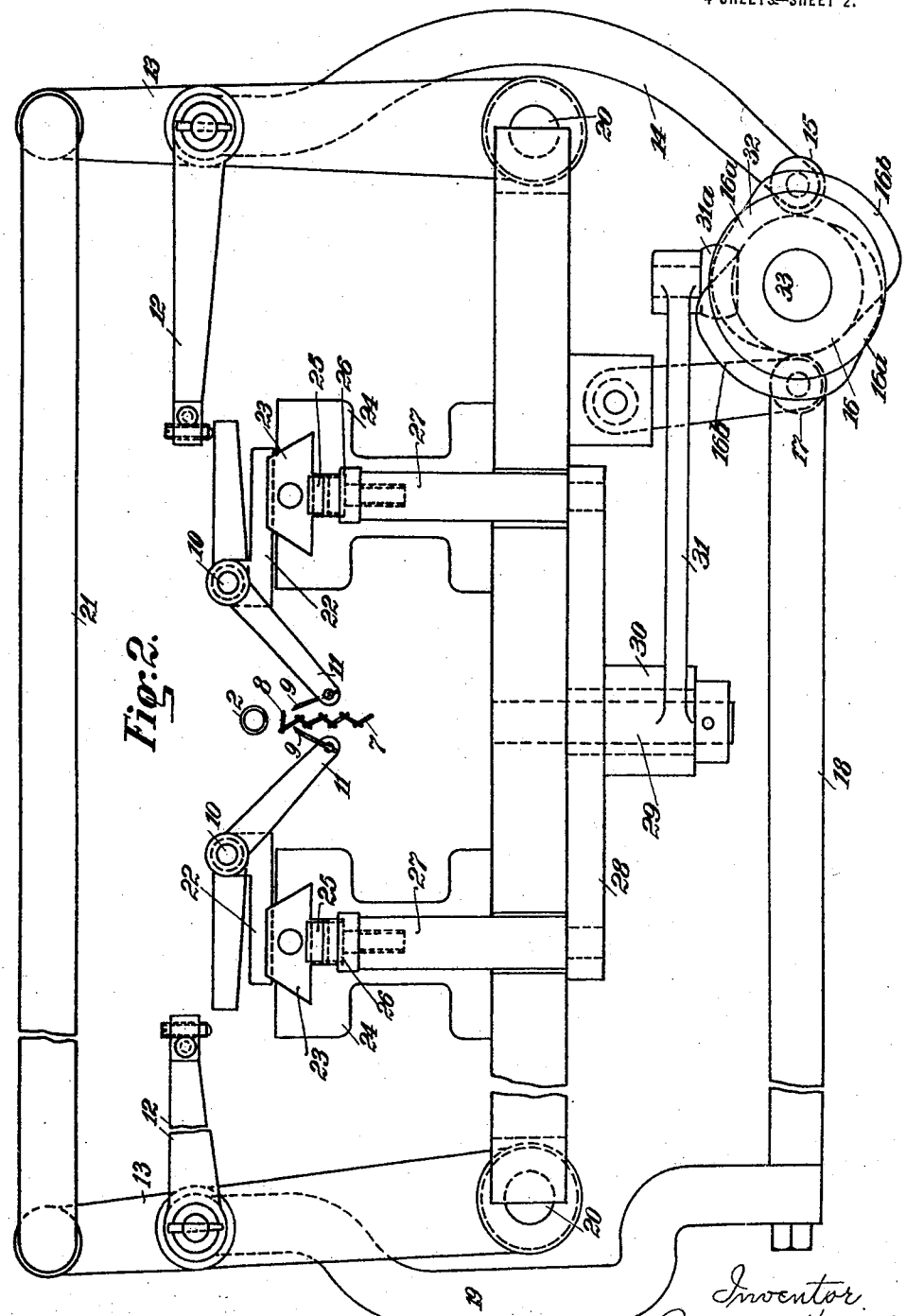

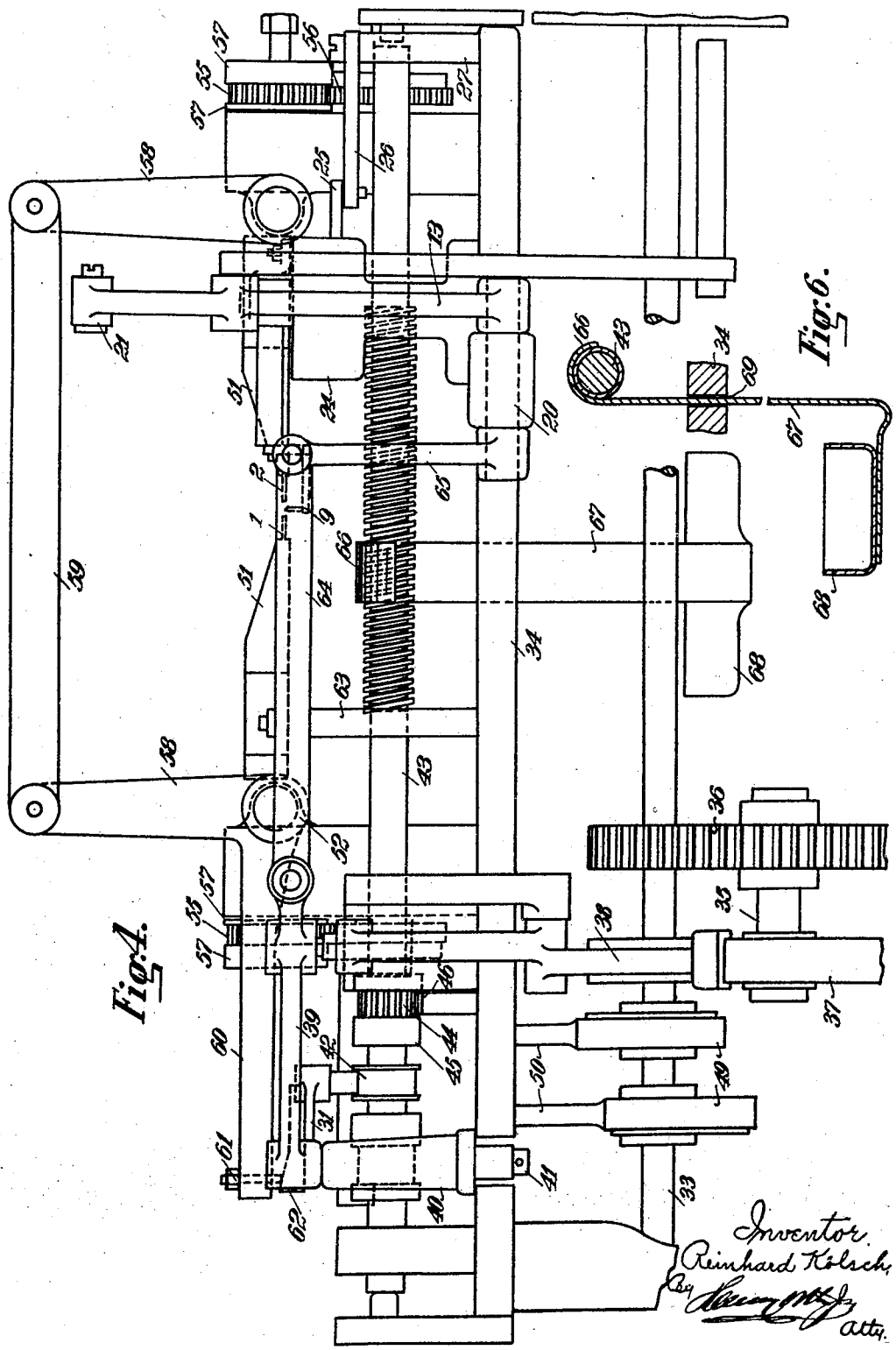

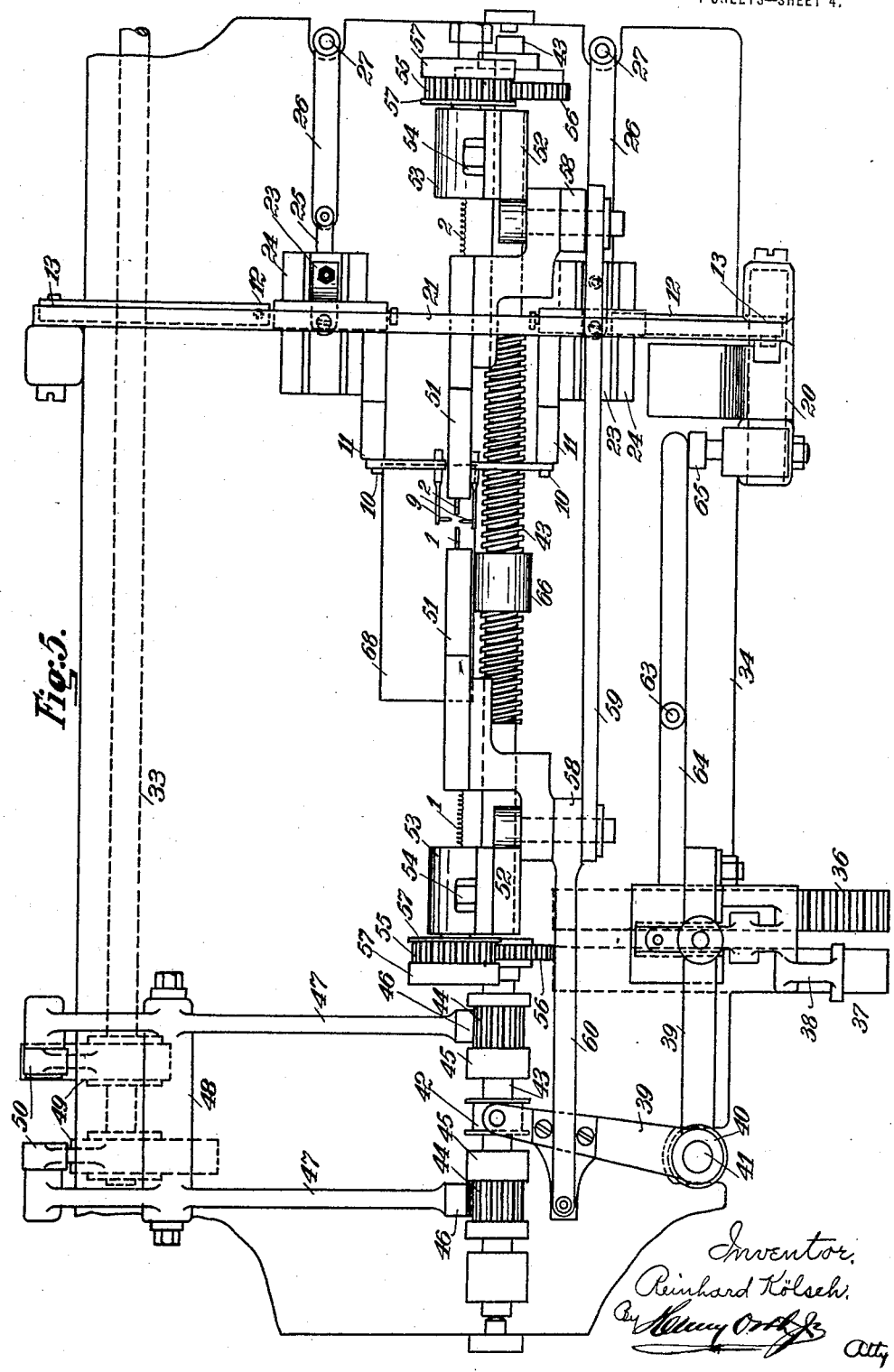

UNITED STATES PATENT OFFICE.

REINHARD KÖLSCH, OF PFORZHEIM, GERMANY, ASSIGNOR TO THE FIRM OF LOUIS KUPPENHEIM, OF PFORZHEIM, GERMANY.

MACHINE FOR THE MANUFACTURE OF RINGLET MESH OR NET WORK.

1,417,257.                Specification of Letters Patent.   Patented May 23, 1922.

Application filed June 29, 1920. Serial No. 392,898.

(GRANTED UNDER THE PROVISIONS OF THE ACT OF MARCH 3, 1921, 41 STAT. L., 1313.)

*To all whom it may concern:*

Be it known that I, REINHARD KÖLSCH, a citizen of the German Republic, and resident of Pforzheim, in the German Republic, have invented certain new and useful Improvements in Machines for the Manufacture of Ringlet Mesh or Net Work, (for which applications for patents have been filed in Germany Oct. 3, 1914; July 14, 1916; July 21, 1921; Austria, Jan. 29, 1917; August 16, 1917; Hungary, Feb. 5, 1917; September 22, 1917; Switzerland, Jan. 3, 1917; August 17, 1917; Great Britain, March 23, 1917; August 29, 1917; France, Jan. 8, 1917; August 30, 1917,) of which the following is a specification.

The finished mesh or net work is suspended during its formation from two wire helixes which serve for receiving, as well as for carrying the mesh or net-work; more precisely stated: the work is suspended first from only one of said helixes, whereas the newly formed ringlets or meshes are taken up by the other helix, the product being transported in this way from the one helix to the other, corresponding to the formation of the ringlets or meshes.

The mesh or net work in question as employed for ladies' bags, purses and the like, especially such of precious metal, consist of ringlets of very small diameter, and the wire employed for the manufacture of these ringlets has, consequently, a very small diameter. This small diameter is chosen not so much because of the preciousness of the material, but in view of the possibility of more easily producing æsthetic and artistic effects when a large number of small rings can be accommodated upon a small area. But when the diameter of the rings is small, the introduction of the ends of the pre-shaped wire into the finished rings or ringlets is rendered difficult since the inner space of each of these latter contains already parts of two ringlets, or, more precisely, the two ringlets which are to receive the preliminarily bent wire contain already parts of three ringlets, as may be seen from Figure 1 of the accompanying drawings. Owing to the fact, the diameter of the ringlets must be comparatively large, as otherwise the formation of the new ringlets cannot proceed sufficiently secure.

Now, in order to be able to employ ringlets with as small a diameter as possible and to make use of wire of as small a diameter as possible, the first feature of this invention resides in letting the receiving helix lie somewhat higher than the giving helix, viz for about half the diameter of a ringlet, in consequence of which all ringlets remain in their proper relative position so that the introduction of the wire ends into the ringlets proceeds far more easily than if two helixes are arranged in line as in the form of construction hitherto employed.

Another feature of the invention resides in introducing the preliminarily bent wire into the respective two ringlets not below one of said two helixes, but below the space between them, or between their neighbouring ends respectively; and of said two ringlets the one is suspended from the end of the lower helix, whereas the other is connected with that ringlet which is suspended from the end of the higher helix.

Before proceeding with stating the features of my invention I find it necessary to explain in detail the two features above mentioned, viz with reference to a figure, and, therefore, in order to make my invention more clear, I refer to the accompanying drawings, in which similar letters denote similar parts throughout the several views, and in which:

Fig. 1 shows a piece of the ringlet mesh or net work produced by my improved machine, said piece being shown connected with two machine parts hereinafter described;

Fig. 2 is a side view of certain essential machine parts, especially of the ringlet lifters with their actuating parts, as is also hereinafter fully described;

Fig. 3 shows the same parts seen from one of the longitudinal sides of the machine;

Fig. 4 is a front view of the machine, some of the parts represented in Figures 2 and 3 being left away for the sake of clearness;

Fig. 5 is a plan of the parts shown in Figure 4; and

Fig. 6 shows a detail which is also hereinafter described.

Referring to Figure 1, 1 is the lower helix which delivers the mesh or net work over to the higher helix 2 that, thus, is the receiving one. The difference in height between the two helixes amounts to about half the diameter of a ringlet. The mesh or net work hangs down from these helixes quite flat and with the perfectly proper relative position of the ringlets, as seen in the figure in question, the free space in each ringlet being in this case the largest possible.

The ringlets are formed at the place indicated by the arrow 3, that is to say, between the ends of the helixes 1 and 2. 4 and 5 are the two ringlets through which the parallel ends of the preliminary bent wire piece are passed in order to be then bent against each other so as to close the ringlet.

The ringlet 5 hangs free; that is to say, it does not hang in any of the two helixes, but is held by the lastly formed ringlet of the new row of ringlets which (said lastly formed ringlet) already hangs at the helix 2; the ringlet 5 is thus coupled at this time with three ringlets, viz. the lastly formed one, just mentioned, of the new row of ringlets; and two ringlets of that row which lies below the ringlets 4 and 5.

The ringlet 4 is still suspended from the helix 1; it is connected, however, only with two ringlets of the row lying below the ringlets 4 and 5; consequently the ringlets 4 and 5 offer sufficient free space for the introduction of the wire ends of the ringlet next to be formed so that the diameter of the ringlet may be chosen very small; the lowermost limit in this respect is that which permits just of the free movement of the four ringlets coupled to that between these four.

The helix 2 is to take up with its free end 6 each newly formed ringlet so that the mesh or net work moves gradually from the helix 1 to the helix 2 until the whole work piece is suspended from the helix 2. Then the helixes 1 and 2 are made to change their relative position of height, as well as their direction of rotation, by means hereinafter-described, so that the mesh- or net-work moves now from the now lower helix 2 to the now higher helix 1, the former delivering the work to the latter, in every respect reversely to what had occurred at the formation of the former row of ringlets.

It is obvious, from what has been described in the foregoing lines, that the newly formed ringlet lies horizontal whereas the finished portion of the work piece hangs vertical. This entails a certain difficulty for the receiving helix to take up the newly formed ringlet.

This difficulty is however, overcome in this invention by means of an auxiliary device consisting of a ringlet lifter formed by an appropriately shaped little pin attached to the end of a lever moved in such a manner that the pin-carrying lever-end ascends as soon as a ringlet has been finished, this ringlet being thereby lifted from its horizontal position into vertical position whereby the receiving helix is enabled to enter that ringlet and receive it too.

Referring to Figure 2, the ring 2 in the middle of the figure indicates the receiving helix; 7 indicates the finished mesh- or network and 8 is the newly formed, horizontally lying ringlet. There are, in the instance shown, two ringlet lifters situated at the two sides, or opposite to the two surfaces, of the piece of work, one of the lifters operating when the piece of work moves in the one direction and the other operating when the piece of work moves in the other direction. Attention must be paid to the fact that the ringlets of the consecutive rows are not exactly vertical, but those of the one row are tilted a little to the one side or surface of the piece of work and those of the other row are tilted a little to the other side or surface of the piece of work. As the new ringlets are formed always at the same place, each new ringlet becomes tilted to the same side or surface of the whole row to which it belongs. It is for this reason that two ringlet lifters are provided. Each of them consists of a pin 9, the free end of which is pointed in the direction to the piece of work; the oblique surface at the pin end is made slightly concave. This configuration is however, not particularly essential; the end of the pin may, for instance, be forked or may have any other shape guaranteeing secure entrance of the pin into the ringlet, as well as preventing the ringlet from falling off the pin end.

The pin 9 is affixed to the end of a bell-crank lever 11 fulcrumed at 10 to its bearing and is intermittently oscillated. This is effected by a lever 12 acting upon the free arm of the bell-crank lever 11 and held by a vertical arm 13. As there are two bell-crank levers 11, there are also two arms 13 which are connected at their upper ends by a horizontal bar 21. The righthand arm is rigidly connected with an arm 14 extending downwards and having at its lower end a roll 15 which is in contact with a cam disk 16 that operates also a horizontal bar 18 having at its righthand end a roll 17 and being connected at its lefthand end with an arm 19 connected in its turn with the lefthand arm 13. The two arms 13 are hinged to the frame or table of the machine.

The cam disk 16 actuates the levers 11, by the mediation of the arms 14 and 13, in such a manner that after the finishing of a new ringlet the lever 11 next to be operated, together with its pin, is oscillated for such an extent that the new ringlet is sufficiently lifted to enable the receiving helix to take up that ringlet. When the respective row of ringlets has been completed, and the piece of work hangs solely at said helix, not only the position of height of the helixes and the direction of rotation of these latter is changed, or reversed respectively, but the arms 14 and 13 are shifted from the one position to the other so as to draw the one lever 12 off the respective lever 11 and make the other lever 12 take over the respective lever 11. This change of position takes place after the completion of every row of the ringlets.

In order to make it perfectly certain that the receiving helix grasps, and takes hold of, the newly formed ringlet, I have arranged the ringlet lifters upon slides by means of which they may be moved in the direction to the respective helix so as to carry the ringlet in question to that helix and enable this latter to take into it during its rotation. This relative movement between the helixes and the ringlet lifters might be brought about by moving the helixes laterally in the direction to the ringlet lifters, but I prefer the other mode of operation because the helixes are moved already in a twofold manner, viz lifted and lowered, as well as rotated in one and the other direction. Each ringlet lifter is first moved upwards so that it grasps the ringlet, after which the lifter with the ring is displaced to the respective helix, or to the receiving end of it respectively, the ringlet being in the mean time lifted so that said helix end can enter the ringlet and take proper hold of it. The lifter is then removed to its former position, after which the play is repeated as often as is necessary to complete the row of ringlets just in course of production.

Referring again to Figure 2, as well as to Figure 3, the bearings 22 of the ringlet lifters 11 are secured to horizontal slides 23 located in guide-pieces 24 affixed to the table of the machine. Each slide has at its bottom a laterally projecting bar 25 by which it is coupled to one end of a bar 26, the other end of which is connected with a vertical bolt 27. The two bolts 27 are affixed to the two ends of a double-armed lever 28 having as its fulcrum or pivot a bolt 29 extending vertically downwards from the lower surface of the table. The lever 28 is rigidly connected with a hub or sleeve 30 also held by the bolt 29, and from this hub or sleeve extends an arm 31 having at its free end a roll 31$^a$ located in the partly oblique groove formed by a pair of cam disks 32. The means for rotating this shaft are not shown. Also the cam disk 16 already mentioned is keyed to this shaft.

The cam disk 32 oscillates the lever 28 by the mediation of the arm 31, and owing to the connection of the lever 28 with the slide 23 by the mediation of the parts 27 26 25 said slides are moved to and fro, as are also the bearings 22 with the levers 11. These levers with their pins 9, or the ringlet lifters respectively, are thus laterally moved for the purpose of carrying the newly formed ringlet for the receiving end of the receiving helix, as already described.

The cam disk 16 has cams 16$^a$ and cams 16$^b$, of which the former serve for raising the ringlet lifter only so far that it can grasp the ringlet; then the lifter is laterally displaced, and after this it is further raised by one or the other of the cams 16$^b$ whereby the lifting proper of the ringlet is effected. The arm 31 is thus actuated between the times in which the cams 16$^a$ and 16$^b$ operate.

I have already mentioned that the two helixes are arranged at different heights and that they change their positions when a row of ringlets has been completed. This change of position, viz corresponding to about half the diameter of a ringlet, as has also already been mentioned, is, in fact, necessary only at the end of the helixes where these latter co-operate with the ringlet lifters, and in view of this fact I arrange the known helix holders pivotally, the pivots being provided at the ends located contrarily to the working ends of the helixes. The helix holders may thus oscillate upon these pivots, viz in vertical direction, the extent of the oscillation being such, i. e. so small, that the ends of the helixes move only through a way corresponding to half the diameter of a ringlet.

As there are two helix holders which must be oscillated at the same time, they are connected with each other by a lever frame to which is affixed a lever having a pin gliding upon an inclined plane. This inclined plane is attached to another lever oscillated in certain appropriate intervals from the main shaft of the machine, and moving thus in its turn that incline plane correspondingly. This movement is transmitted by the pin mentioned to said lever frame which is connected with the two helix holders whereby these latter are shifted in the manner desired, viz so as to change the relative position of the free helix ends.

The ringlets form in the mesh or net work not only horizontal and vertical rows, but also diagonal ones lying at an angle of 45 degrees to said other rows as becomes obvious from Figure 1. This is a consequence of the fact that each ringlet is coupled with two located above it and with two located below it, the five ringlets forming a lying cross. This relative position of the ringlets entails the necessity of shifting the mesh or net work for half the diameter of a ringlet to the right or to the left, as the case may be, when a horizontal row of ringlets has been completed, as will be clear without a more detailed explanation.

This horizontal shifting of the mesh or net work is effected simultaneously with shifting the ends of the helixes, as before described, and is brought about by the same lever that is provided with the inclined plane, as has already been described in detail. Said lever when being oscillated displaces a shaft longitudinally; this shaft has cog-wheels which are in gear with other cog-wheels connected with the helixes and serving to rotate them. These latter cog-wheels are provided with lateral disks or equivalent parts against which lie the cog-wheels carried by said shaft so that when this latter is longitudinally displaced, the cog-wheels of the helixes are axially moved together with the shaft and its cog-wheels, as are also the helixes themselves.

The helixes move, thus in a threefold way: first, in a vertical plane so as to shift the helix ends, making now the one and then the other one the receiving end for the newly formed ringlet; second, longitudinally, corresponding to half the diameter of a ringlet, when another row of ringlets is commenced; and third, they are intermittently rotated so as to make their ends grasp and take hold of the newly formed ringlets, as has all been described in the foregoing part of this specification.

The intermittent rotary movement of the helixes must also be changed, that is to say: the direction of rotation must be changed, before a new row of ringlets is commenced. In order to secure perfect simultaneousness of the three kinds of motion, or of their shifting or change respectively, I make use of the lever that shifts the helixes vertically, as well as horizontally, also for changing their direction of rotation, viz by the mediation of the shaft that is longitudinally displaced by said lever. This shaft is provided with a fast coupling part by means of which it is alternately coupled with cog-wheels otherwise loosely rotatable upon it and being rotated to and fro by cogged sectors driven in their turn by eccentrics, whereby the intermittent rotary movement of the helixes is effected, because the longitudinally displaceable shaft driving said cog-wheels and the other parts is driven itself during the one coupling time in the one direction and during the other coupling time in the other direction.

In conformity with all these operations and movements it is necessary to shift also the ringlet lifters when a row of ringlets has been completed and another is to be commenced, the one ringlet lifter being then set at rest and the other being actuated, as has also been already described. Also the corresponding movement of the ringlet lifters before another row of ringlets is commenced is effected by means of the lever which shifts the helixes vertically and horizontally, this lever being connected with the ringlet lifters by transmission levers in such a manner that the lifters are properly actuated at the proper times, as is more fully described hereinafter.

In order to relieve the helixes as much as possible from the weight of the mesh or net work suspended from them, a vessel adapted to receive that piece of work is suspended from the longitudinally displaceable shaft that serves to shift the helixes in horizontal direction, the arrangement being such that said vessel is attached to a nut situated upon a suitably screw-threaded part of the said shaft. As this latter rotates intermittently, the vessel moves to and fro in conformity with the formation of the mesh or net work.

Referring now to Figures 4-6, the short shaft 35 the bearings for which (not shown) are affixed to the bottom surface of the machine table 34, has keyed to it a ratchet wheel 36 which is driven intermittently from the main shaft by the mediation of levers and a pawl (also not shown) in such a manner that it performs one complete rotation during the time in which two complete rows of ringlets are formed. To the shaft 35 is also secured a cam disk 37, the circumference of which is subdivided into two parts, of which one has a greater diameter than the other. The cam disk 37 cooperates with an angular lever 38 which is fulcrumed at its angle proper to the table 34 and the lower end of which glides upon the circumferential surface of said disk. The upper end of the lever 38 is connected with a horizontally arranged bell-crank lever 39 having a pivot 41 supported in a lever 40 also secured to the table of the machine. The other end of the lever 39 is connected with the middle part 42 of a coupling device provided upon the shaft 43, the arrangement being such that said part 42 is laterally moved when the lever 39 is actuated.

The coupling part 42 is connected with the shaft 43 by slot and key so as to be axially displaceable upon said shaft. The axial movement of the coupling part 42 is limited by collars that are affixed to the shaft lefthand and righthand from said part 42, and when this latter is further laterally moved, the shaft is longitudinally displaced as much or, more precisely, as little as corresponds to half the diameter of a ringlet. Cog-wheels 44 with lateral coupling parts 45 are loosely arranged upon the shaft 43 at both sides of the coupling part 42; said cog-wheels are rotated alternately in one and the other direction by cogged segments 46 attached to levers 47 having their fulcrums preferably at 48 at the table of the machine and being moved by means of the eccentrics 49 which are keyed to the main shaft 33, as well as by the eccentric rods 50. Since, consequently, the cog-wheels 44 are constantly turned to and fro, the couplings 42 and 45 co-operating with them are, in known manner, so devised that the shaft 43 is rotated by the one coupling in the one direction and by the other coupling in the other direction, depending upon whether the coupling 42 is coupled with one or the other cog-wheel. The rotary motion of the shaft 43 as produced by the means in question is intermittent because the shaft is turned either by the one or by the other of the cog-wheels 44.

The shaft 43 extends along over the whole length of the machine and serves for actuating the helixes that deliver and receive the mesh or net work suspended from them, as already described. These helixes are located in holders 51, as also already described, and each holder has a longitudinal bore or channel containing the respective helix. The holder is furthermore provided with a longitudinal slot situated at the bottom of the bore or channel; the piece of work just in course of production hangs down from the helixes through the slots in question, i. e. of both holders. Each of these latter is secured to a bearing piece 52 to which is screwed a bearing piece 53 by means of screws 54. The bearing piece 53 is provided with the bore or channel for the reception of the respective helix (1 or 2) and carries also a cog-wheel 55 which is provided with lateral collars and is connected with that helix so that this latter is obliged to move together with this cog-wheel.

The cog-wheels 55 mesh with cog-wheels 56 keyed to the shaft 43 so that the cog-wheels 55 and consequently also the helixes are intermittently rotated in one or the other direction corresponding to the direction of rotation of the shaft 43.

The cog-wheels 56 are rigidly affixed to the shaft 43; they mesh with the cog-wheels 55 and fit exactly between the collars 57 of these cog-wheels. Owing to this arrangement the cog-wheels 55, as well as the helixes, are displaced simultaneously with the shaft, i. e. with the longitudinal displacement of the latter. That movement is due also to the fact that each cog-wheel 55 is connected with the appertaining helix by means of a cylindrical spindle (not shown) which is supported in the bearing piece 53 and may be rotated, as well as longitudinally displaced therein. By this means, the lateral displacement of the helixes for half the diameter of a ringlet at the commencement of another row of ringlets is brought about. The same movement is made use of also for changing the position of height of the helix ends relatively to each other. Connected with the helix holders and oscillating upon the same pivots are upright arms 58 which are connected with each other by a rod 59 with which they form a kind of frame. One of these arms forms a bell-crank lever and has an approximately horizontal by-arm provided at its free end with a little, exactly adjustable pin 61 lying upon an inclined plane 62 provided at the bell-crank lever 39.

By the movement of this lever and of the coupling part 42 which is connected with said lever the direction of rotation and the longitudinal displacement of the shaft 43, as well as the direction of rotation of the cog-wheels 55 and 56 which are connected with the said shaft is, or are, changed. The horizontal arm 60 is intermittently lifted upon the pin 61 by the displacement of the inclined plane 62 by means of the bell-crank lever 39. The arm 60 is pressed against this inclined plane by a spring or helix not shown. That displacement of the inclined plane 62 produces, by the mediation of the pin 61, a slight oscillation of the arm 60, and, consequently, also of the two arms 58, as well as of the helix holders 51 connected with these arms, in such a manner, that at each displacement of the shaft 43 the one holder is lifted and the other is lowered. As the difference in the height of the helixes amounts to about half the diameter of a ringlet, as already repeatedly mentioned, only the free front or inner end of each helix need be lifted or lowered without influencing the driving device. It is sufficient to let the helix lie free, in the manner shown in Figure 4, between the holder 51 and the bearing piece 53 in order to allow of the very slight bending necessary.

The two ringlet lifters 9 which are merely indicated in the Figures 4 and 5 are shifted also by means of the bell-crank lever 39. For this purpose a double-armed lever 64 is provided upon the table of the machine, and the left arm of this lever is connected with the bell-crank lever 39 (Figure 5). The other arm of the lever 64 is in contact with a lever arm 65 secured to the spindle 20 that has its bearing also at said table. The spindle 20 is provided with the arm 13 which is connected by the rod 21 with the similar arm arranged at the opposite side of the machine, as already described in an earlier part of this specification.

It has already been mentioned that the mesh or net work is moved in steps, corresponding to the successive formation of the ringlets, from the one helix to the other, to and fro, and as the weight of the piece of work increases in proportion to the addition of fresh rows of ringlets, it is important to relieve the helixes as much as possible from that weight. That might occur automatically because when the piece of work has reached a certain length its lower part will rest upon the table of the machine, but this kind of relief entails an oblique pull upon the piece of work at every shifting from the left to the right and from the right to the left whereby folds are produced and the proper continuation of the work is disturbed.

To overcome this drawback, the shaft 43 is provided with a screwthread upon which is located a semi-nut 66 from which extends downwards an arm 67 holding a vessel 68; this arm extends through a slot 69 of the table, and the vessel 68 is located below that slot. The pitch of the screwthread corresponds to the lateral movement of the piece of work, so that the vessel 68 follows the latter to the left and to the right. The direction of movement of the vessel is changed exactly as the direction of movement of the piece of work which hangs thus always properly vertical and which is relieved from any surplus of weight by means of the vessel in question.

Having now described my invention, what I desire to secure by a patent of the United States is:

1. In a machine of the character described two ringlet row holding helixes one of which is arranged lower than the other for about half the diameter of a ringlet and having a space between their operating ends, one of said helixes for successively discharging ringlets and the other taking up new ringlets as they are formed, means for rotating the helixes to produce the feed of the ringlet mesh and means to lift a freshly inserted ringlet from a horizontal position into a position to be taken up by one of the helixes.

2. In a machine of the character described, the combination, of two rotary ringlet row holding helixes, of which the one is arranged lower than the other for about half the diameter of a ringlet; and of a pin-shaped ringlet lifter adapted to lift each newly formed horizontal ringlet into vertical position so as to bring it into the way of the rotating end of the higher helix; means for thus operating said lifter, and means for rotating said helixes, as set forth.

3. In a machine of the character described, the combination, of two rotary ringlet row holding helixes; two pinshaped ringlet lifters adapted to lift each newly formed horizontal ringlet into vertical position; said lifters being arranged at the two sides of the mesh or net work formed by the ringlets; and means for actuating the said lifters alternately, substantially as described and shown.

4. In a machine of the character described, the combination, of two rotary ringlet row holding helixes, two pin-shaped ringlet lifters adapted to raise each newly formed horizontal ringlet into practically vertical position and to be moved laterally to and fro with respect to said helixes; the said lifters being arranged at the two sides of the mesh or net work formed by the ringlets; and means for actuating the said lifters alternately and means for rotating said helixes, as set forth.

5. In a machine of the character described, the combination, of two rotary ringlet row holding helixes and means for rotating said helixes; two pin-shaped ringlet lifters; means raising said lifters, and means for moving them laterally to and fro at both sides of the mesh or net work, in such a succession of movements that the lifters are first raised so far as to grasp the newly formed ringlet, are then displaced so as to carry that ringlet to the rotating working end of one or the other helix, and are finally further raised so as to make the horizontal ringlets stand upright, substantially as described and shown.

6. In a machine of the character described, the combination, with two rotary ringlet row holding helixes, and means for rotating them, of two ringlet lifters; means for lifting said lifters themselves and means for moving them laterally to and fro at both sides of the mesh or net work to be formed by said ringlets; helix holders adapted to be turned upon horizontal axles located contrarily to the working ends of the helixes so as to permit of oscillatory movement of these ends, and means for thus actuating said holders, substantially as described and shown and for the purpose set forth.

7. In a machine of the character described, the combination, with two rotary ringlet row holding helixes, and means for rotating the helixes intermittently, of two ringlet lifters; means for moving said lifters vertically, as well as horizontally to and fro in an appropriate succession; helix holders adapted to be intermittently raised and lowered at the working ends of the helixes; means for thus actuating said holders; a lever frame connecting said helix holders with each other and having as a part of it a bell-crank lever; an adjustable pin at said bell-crank lever; another lever adapted to be laterally oscillated; an inclined plane provided at said other lever and forming a support for said adjustable pin, the whole combination and arrangement of parts being adapted to operate as described.

8. In a machine of the character described, the combination, with two rotary ringlet row holding helixes, and means for rotating them successively, of two ringlet lifters adapted to raise the ringlets from horizontal position to vertical position; means for moving said lifters vertically, as well as horizontally in an appropriate succession; helix holders adapted to raise and lower the working ends of the said helixes intermittently; a shaft adapted to be longitudinally displaced; cog-wheels provided upon said shaft; other cog-wheels connected with the said helixes and meshing with said other cog-wheels; collars attached to the said cog-wheels and slides carrying the latter; this combination and arrangement of parts being adapted to operate in the manner described and shown.

9. In a machine of the character described, the combination, with two rotary ringlet row holding helixes (1, 2), and with means for rotating them successively, of two ringlets lifters (9, 9) adapted to be moved vertically, as well as horizontally; means for thus moving said ringlet lifters in an appropriate succession of movements; helix holders (51) adapted to be vertically oscillated so as to lift and lower the working ends of the helixes; means for moving said working ends intermittently in opposite directions; a lever frame (58, 59, 60) connecting said helix holders with each other; and having as a part of it a bell-crank lever (60); an adjustable pin (61) at this lever; another lever (39) and an inclined plane (62) at it; a shaft (43) adapted to be longitudinally displaced; a coupling part affixed to said shaft; cog-wheels (44) arranged loosely upon the latter; cogged sectors (46) meshing with said loose cog-wheels; eccentrics adapted to actuate said sectors, the whole substantially as shown and described.

10. In a machine of the character described, the combination, with two horizontal helixes (1, 2) adapted to be intermittently rotated and to be raised and lowered at their working ends which are opposite to one another, and with means for rotating said helixes appropriately, of two ringlet lifters (9, 9) adapted to be moved to and fro with respect to the two sides of the mesh or net work produced; helix holders (51) adapted to swing around horizontal axles, and means for actuating these holders; a shaft (43) adapted to be longitudinally displaced; cog-wheels (56) provided upon said shaft; other cog-wheels connected with the said helixes and meshing with the first-mentioned cog-wheels; collars attached to the said cog-wheels (58); slides (52) carrying the latter; and a lever transmission between the said lever (39) and the ringlet lifters; the whole arrangement and combination of parts being adapted to operate as set forth.

11. In a machine of the character described, the combination with two helixes adapted to hold the mesh or net work formed by the ringlets, of holders adapted to lift and lower the working ends of said helixes; ringlet lifters arranged at the two sides of the mesh or net work, and means for rotating the helixes, for actuating said holders and for operating said lifters in proper succession; a shaft adapted to be longitudinally displaced and means for thus displacing said shaft; a screw thread upon a port of said shaft; a female screw supported by said screw thread; and a vessel suspended from the said female screw, said vessel being adapted to take up the work piece and carry it with it laterally to and fro, substantially and for the purpose set forth.

In testimony whereof I have affixed my signature.

REINHARD KÖLSCH.

In the presence of—
  MARIE DANZ,
  RENE THUM.